United States Patent [19]
Bingel

[11] Patent Number: 5,655,010
[45] Date of Patent: Aug. 5, 1997

[54] LINE-POWERED MODEM WITH CAPACITIVE ISOLATION

[75] Inventor: Thomas J. Bingel, Belleair Beach, Fla.

[73] Assignee: Paradyne Corporation, Largo, Fla.

[21] Appl. No.: 514,040

[22] Filed: Aug. 11, 1995

[51] Int. Cl.$^6$ ................................................. H04M 11/00
[52] U.S. Cl. ...................... 379/93.28; 379/412; 375/222
[58] Field of Search ................................. 379/96–98, 93, 379/94, 395, 405, 379, 376, 412, 406, 413, 345, 377, 399, 387, 398, 375; 375/222

[56] References Cited

U.S. PATENT DOCUMENTS

| | | | |
|---|---|---|---|
| 5,086,454 | 2/1992 | Hirzel | 379/98 |
| 5,369,687 | 11/1994 | Farkas | 379/98 |
| 5,500,895 | 3/1996 | Yurgelites | 379/412 |

Primary Examiner—Wing F. Chan
Attorney, Agent, or Firm—Thomas, Kayden, Horstemeyer & Risley

[57] ABSTRACT

A modem is disclosed which is separated into two parts, a first modem circuit consisting of digital circuits, and a second modem circuit consisting of a CODEC and analog circuits. The two modem circuits are separately powered by a first and second power source, respectively, and connected by an isolation circuit. The second power source derives all of its power from the telephone line to which the modem is connected. The portions of the isolation circuit which transfer data and control signals between the first and second modem circuits are constructed using coupling capacitors and latch circuits, and a similar capacitor is connected between the reference grounds of the first and second power sources. Each latch circuit uses a nand gate having two inputs, one of which is connected to momentarily receive a potential equivalent to logical zero, thereby providing a reset when the modem is first energized.

11 Claims, 4 Drawing Sheets

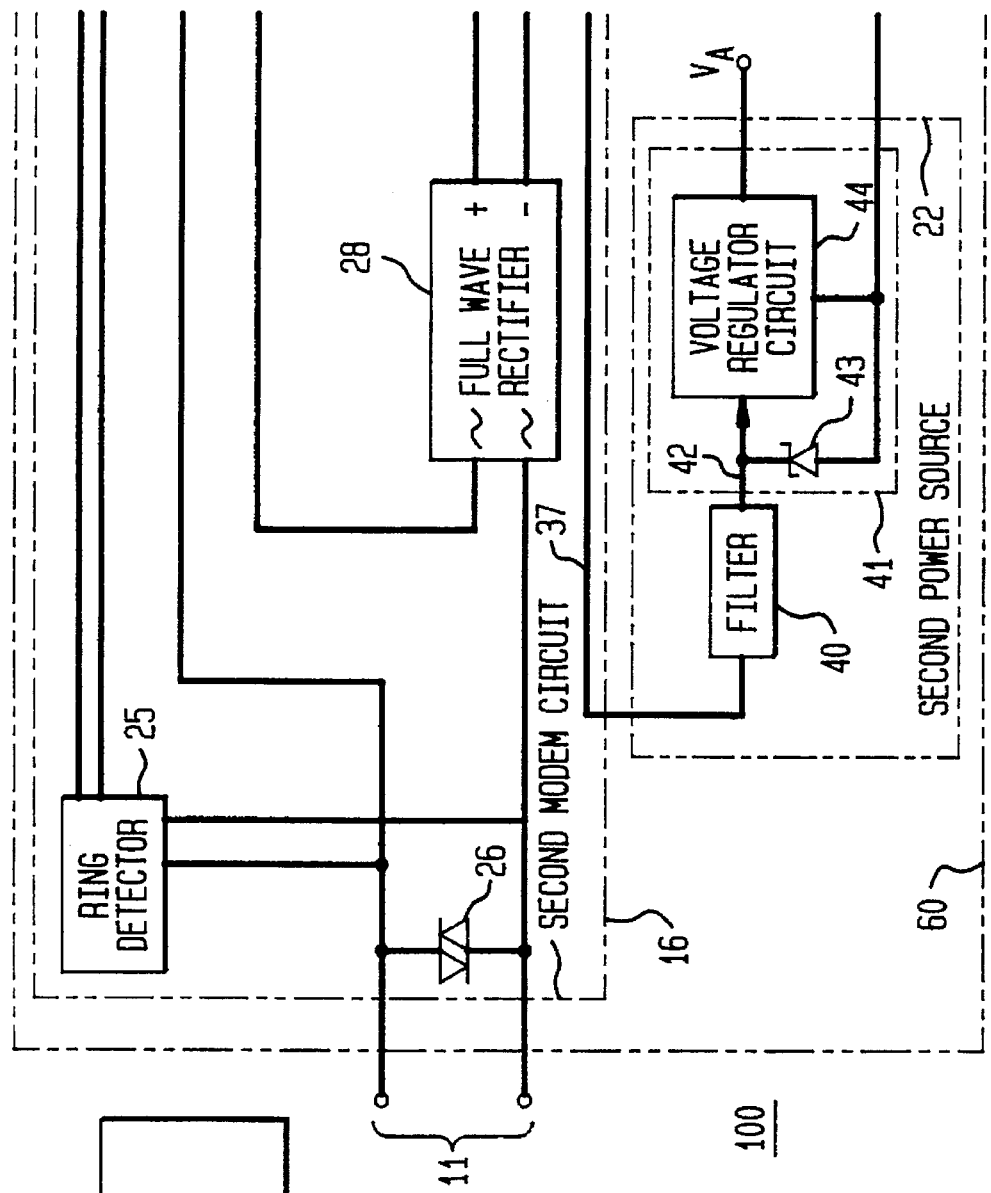
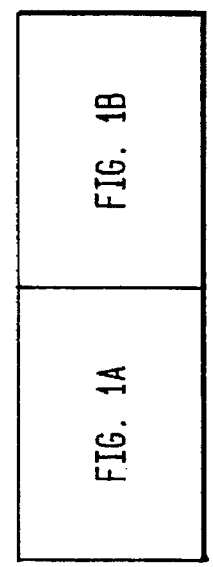
FIG. 1A
FIG. 1
| FIG. 1A |
| FIG. 1B |

LINE-POWERED MODEM WITH CAPACITIVE ISOLATION

FIELD OF THE INVENTION

The present invention relates to modems for coupling data between a telephone line and a data device and, more particularly, to a modem which electrically isolates the telephone line from a data device without using an isolation transformer.

DESCRIPTION OF THE RELATED ART

The Federal Communications Commission (FCC) has issued a stringent set of regulations and specifications that must be satisfied by equipment intended for connection to a telephone line to prevent such equipment from degrading the operation of the network. This equipment, such as a modem, must satisfy these regulations and specifications before the equipment is connected to the telephone network. Generally, some form of electrical isolation circuitry is required to prevent voltage transients or surges generated by the equipment from reaching the telephone line and thereby degrading telephone network operation. Additionally, the connected equipment must not provide a direct current path from the telephone line to ground. Further, the isolation circuitry provides a degree of lightning or surge protection for the modem.

The use of a transformer within a modem to electrically isolate the telephone line is well known. Typically, a directly coupled or capacitively coupled isolation transformer is connected between the two wire telephone line and the analog front end of the modem circuit to provide the necessary electrical isolation.

Although a transformer supplies a high degree of electrical isolation, the transformer is also one of the physically largest and heaviest electrical components in a typical modem circuit. The placement of the transformer on a modem printed circuit board having limited board layout space is a challenging design task because the transformer is much larger than the other electrical components of the remaining modem circuitry. Furthermore, the overall weight of a modem is typically significantly increased by the use of the isolation transformer in a modem design. Consequently, the physical size and weight of the modem, as well as the appearance of the packaging or housing for a modem, is often constrained by the physical characteristics of the isolation transformer.

To reduce the size and weight of the isolation transformer, it is well known to provide one signal path for coupling certain telephone line signals, such as incoming ringing signals, to the modem circuitry and another signal path which couples the data signals to the modem circuitry via a capacitively coupled isolation transformer. This capacitive coupling design enables the use of a smaller and lighter isolation transformer by preventing saturation of the small core of the transformer with direct current. Simply reducing the transformer size further, to accommodate packaging or weight goals, causes a deleterious increase in transformer distortion, with a resulting decrease in modem performance, especially high-speed modem performance.

Alternative prior art modems utilize electro-optical isolators to isolate the telephone line from the data device. Electro-optical isolators typically employ an emitter, such as a light emitting diode (LED), which supplies a light signal in response to an input electrical signal, and a photodetector that supplies a corresponding electrical output signal in response to the received light signal. The use of electro-optical isolators for electrically isolating an input circuit from an output circuit is well known.

U.S. Pat. No. 5,369,687, issued Nov. 29, 1994, to S. E. Farkas discloses a modem in which electro-optical isolators are used for coupling signals between a first modem circuit including a transmitter, a receiver and a controller, and a second modem circuit connected to the telephone line, thereby electrically isolating the telephone line. The Farkas patent uses separate power sources to power the first and second modem circuits and to maintain the electrical isolation provided by the electro-optical isolator devices connected between these modem circuits.

The second modem circuit converts (encodes) an incoming analog telephone signal received via the telephone line to an incoming digital data signal which is provided to the receiver. Furthermore, the second modem circuit converts (decodes) an outgoing digital data signal supplied by the transmitter to send an outgoing analog telephone signal over the telephone line. The isolation circuit couples the incoming digital data signal, the outgoing digital data signal, and certain control signals between the second modem circuit and the first modem circuit to insure that the telephone line is electrically isolated from a data device, such as a data terminal or a computer, connected to the first modem circuit. Electrical isolation is further maintained between the first modem circuit and the second modem circuit because a first power source supplies operating power to the first modem circuit and a second power source draws power directly from the telephone line to supply operating power to the second modem circuit. The first and second power sources in the Farkas are not in any way connected electrically. In the Farkas patent, electro-optical isolators are connected between the first modem circuit and the second modem circuit to couple signals between these modem circuits and thereby electrically isolate the first modem circuit from the second modem circuit.

Unfortunately, electro-optical isolators that are available today are slow and consume too much power to implement the design presented in the Farkas patent. In the circuit of that patent, three electro-optical isolator receivers, one electro-optical driver, and the CODEC would have to be powered from the second power source which develops the voltage, $V_A$, from the telephone line. (The electro-optical isolator designated as 34 in FIG. 1B of that patent actually consists of two optical coupler devices as pointed out in lines 64–68 of column 8 of the patent.) These electro-optical coupler devices consume about 30 milliamps. of loop current which is unacceptably high.

SUMMARY OF THE INVENTION

A modem that supplies the same elements with power from the telephone line as in the Farkas patent but which consumes a much lower amount of power from the telephone line is provided in accordance with the present invention wherein electrical isolation between the first and second modem circuits is provided by transformerless capacitive isolator circuits, and the return ground for the first modem circuit and the return ground for the second modem circuit are connected through a capacitor. Each of the capacitive isolator circuits uses a similar capacitor to couple digital data from a low impedance source to the input of a latch circuit which recreates the data at its output. The value of the capacitor used in the isolator circuit and between return grounds is relatively small since the capacitors need only provide a differentiator action with the real input impedance of the latch circuit at the data frequency.

Accordingly, the capacitors present a high impedance at 60 Hertz, the frequency most normally present as an interference on telephone lines. In addition, the capacitors in the isolator circuits and the capacitor used to connect the return grounds are selected to have a high working voltage (about 1000 volts) in order to provide effective DC isolation.

It is an aspect of the present invention that each latch circuit is constructed using a nand gate, one input of which is connected to a reset circuit which momentarily provides a guaranteed logical one at the output of the latch circuit after the circuit is energized.

BRIEF DESCRIPTION OF THE DRAWING

FIGS. 1A and 1B when placed side-by-side and interconnecting the commonly designated lines provide a block diagram of the preferred embodiment of the present invention;

DESCRIPTION OF THE PREFERRED EMBODIMENT

Figure 1B:
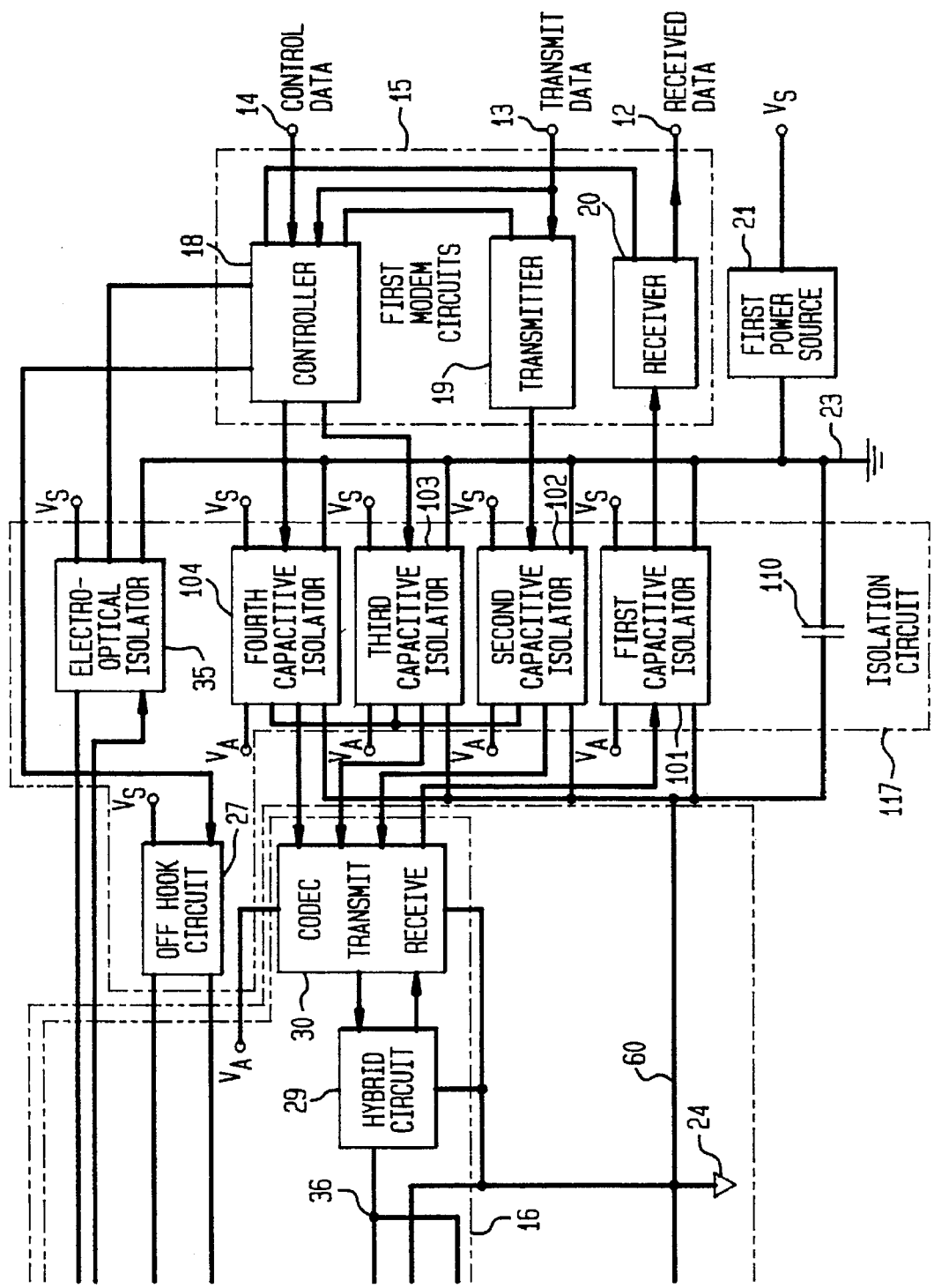

In the drawing, like numerals represent like components throughout the several figures. FIGS. 1A and 1B are a block diagram of the preferred embodiment of the present invention, a modem 100. In these figures, all of the lines, devices and circuits designated by two digit numerals are identical in function and performance to the items with identical numbers in the above-identified Farkas patent. U.S. Pat. No. 5,369,687 to Farkas is hereby incorporated by reference. The modem 100 is designed to accommodate data transfers between a telephone line 11 and an external data device (not shown) such as a data terminal or a computer. The modem 100 conditions an incoming analog telephone signal received via the telephone line 11 to provide received data to the data device via a signal path 12. The modem 10 receives transmit data from the data device via a signal path 13 and operates upon the transmit data to generate an outgoing analog telephone signal suitable for transmission over the telephone line 11. The modem 10 also receives control data from the data device via a control signal path 14 and conducts data transfer operations in response to the control data. For the preferred embodiment, the modem 100 is an advanced modem capable of operating in a selected communications mode, including FSK and various high level communications modes, such as PSK, QAM, and PSK/PAM.

The modem 100 includes a first modem circuit 15 connected to the data device via the signal paths 12, 13 and 14, a second modem circuit 16 connected to the telephone line 11, and an isolation circuit 117 connected between the first modem circuit 15 and the second modem circuit 16. The second modem circuit 16 conditions (encodes) input signals supplied by the telephone line 11 and conditions (decodes) input signals supplied by the first modem circuit 15 and produces output signals to, respectively, the first modem circuit 15 and the telephone line 11. The isolation circuit 117 couples signals between the first modem circuit 15 and the second modem circuit 16 and, furthermore, electrically isolates the first modem circuit 15 from the second modem circuit 16. Therefore, even though the first modem circuit 15 is connected to the data device and the second modem circuit 16 is connected to the telephone line 11, the telephone line 11 is electrically isolated from the data device because of isolation circuit 117.

The modem 100 further includes separate power sources: a first power source 21 and a second power source 22. The first power source 21 supplies operating power to the first modem circuit 15 by generating an operating voltage $V_S$ with respect to a reference ground 23. For the preferred embodiment, the first power source 21 does not draw power from the telephone line 11 to supply the operating voltage $V_S$. The operating voltage $V_S$ is preferably a fixed DC voltage level of +5 volts with respect to reference ground 23 which is the return/ground for the first modem circuit 15.

The second power source 22, which is described in more detail below, is coupled to the telephone line 11 to draw power from the telephone line. The second power source 22 supplies regulated power to the second modem circuit 16 by generating a regulated DC operating voltage $V_A$ with respect to a reference ground 24 which is the return/ground for the second modem circuit 16. It should be noted that ground references 20 and 23 are electrically DC isolated from each other, but unlike the circuit in the Farkas patent, grounds 23 and 24 are advantageously connected to each other by way of high voltage capacitor 110. The reasons for this unusual connection are presented hereinafter in connection with the discussion of the first, second, third and fourth capacitive isolation circuits 101–104.

Accordingly, the first modem circuit 15 receives operating power from a power source that is separate from the source that powers the second modem circuit 16. Thus, electrical isolation is maintained between the first modem circuit 15 and the second modem circuit 16 by the combined use of separate power sources 21 and 22, and the isolation circuit 117.

The first modem circuit 15 includes a controller 18, a transmitter 19, and a receiver 20. The controller 18 is connected to the second modem circuit 16 via the isolation circuit 117, to the transmitter 19 and to the receiver 20, and to the data device via the control signal path 14, and controls the data transfer operations of the modem 10. For the preferred embodiment, the controller 18 sends a pair of control signals, a frame synchronization signal (T/R FS) and a clock signal (MCLK), to the second modem circuit 16 to control the transfer of data to and from circuit 16. Furthermore, the controller 18 supplies transmitter control signals to the transmitter 19 and receiver control signals to the receiver 20 to control modem transmitter and modem receiver operations.

In response to transmitter control signals from the controller 18, the transmitter 19 operates upon transmit data received from the data device via the signal path 13. In particular, the transmitter 19 may perform data compression, data encoding, protocol, format and error control operations upon the transmit data and supplies an outgoing digital data signal to the second modem circuit 16. Likewise, in response to receiver control signals from the controller 18, the receiver 20 may perform data decoding/recovery operations, data decompression, data detection, and error detection upon an incoming digital data signal supplied by the second modem circuit 16. Upon completion of these receiver operations, the receiver 20 sends received data via the signal path 12 to the data device. Construction and operation of a modem controller, a modem transmitter, and a modem receiver, such as, respectively, the controller 18, the transmitter 19, and the receiver 20, are, in general, well known, and the modifications thereto required by the present invention are apparent from the description herein.

The second modem circuit 16 comprises a ring detector 25, a surge protection device 26, a full wave rectifier 28, a hybrid circuit 29, and a coder/decoder (CODEC) 30. In response to control signals from the controller 18, the second modem circuit 16 converts (encodes) an incoming analog telephone signal received via the telephone line 11 to supply an incoming digital data signal to the receiver 20. In addition, the second modem circuit 16 converts (decodes) an outgoing digital data signal supplied by the transmitter 19 to produce an outgoing analog telephone signal for transmission via the telephone line 11 in response to control signals from the controller 18. The incoming digital data signal, the outgoing digital data signal, and the control signals are coupled between the second modem circuit 16 and, respectively, the receiver 20, the transmitter 19, and the controller 18 via the isolation circuit 117 to electrically isolate the second modem circuit 16 from the first modem circuit 15.

The ring detector 25 is connected to the telephone line 11 and, upon the occurrence of a telephone ring event, the ring detector 25 supplies a ring detection signal to the controller 18 via the isolation circuit 117. If the controller 18 has been instructed by the data device to answer incoming calls, then the controller 18 supplies an off hook control signal to an off hook circuit 27, which is connected between the telephone line 11 and the full wave rectifier 28. The off hook circuit 27 thereafter operates to connect the telephone line 11 to the remaining circuitry of the modem 10. For the preferred embodiment, the off hook circuit 27 connects one line, such as the ring line, of the telephone line 11 to the full wave rectifier 28 in response to the off hook control signal, thereby completing the connection of the telephone line 11 to the remaining modem circuitry.

The surge protection device 26, coupled between the ring and tip lines of the telephone line 11, prevents high level voltage transients or surges from entering the modem 10 via the telephone line 11. For the preferred embodiment, the surge protection device 26 is a varistor.

The full wave rectifier 28 is connected between the off hook circuit 27 and the hybrid circuit 29 and ensures that the same polarity of DC signal is presented between junction 36 and the second modem circuit return/ground 24 regardless of the DC polarity on the tip and ring of telephone line 11. The DC signal of junction 36 is provided to the second power source 22 and to the hybrid circuit 29. In addition, the full wave rectifier 28 operates to pass the incoming and outgoing analog telephone signals between hybrid circuit 29 and the telephone line 11.

The hybrid circuit 29 is connected to the full wave rectifier 28 and to a Receive input and a Transmit output of the CODEC 30. The hybrid circuit 29 operates to separate the incoming analog telephone signal from the outgoing analog telephone signal and to place the outgoing telephone signal onto the telephone line 11.

The CODEC 30 is connected between the isolation circuit 117 and the hybrid circuit 29. The CODEC 30 produces the incoming digital data signal to be coupled to receiver 20 by encoding the incoming analog telephone signal from hybrid circuit 29. The CODEC 30 produces the outgoing analog telephone signal by decoding the outgoing digital data signal supplied by the transmitter 19 via the isolation circuit 117.

The construction and operation of the ring detector circuit 25, the off hook circuit 27, the full wave rectifier 28, and a modem hybrid circuit, such as the hybrid circuit 29, are well known. The CODEC 30 is preferably a high precision pulse code modulation (PCM) CODEC, model T7525, manufactured by American Telephone & Telegraph (AT&T) Microelectronics, Allentown, Pa.

The isolation circuit 117 in addition to including the off hook circuit 27 and electro-optical isolator device 35, also includes a first capacitive isolator circuit 101, a second capacitive isolator circuit 102, a third capacitive isolator circuit 103, and the fourth capacitive isolator circuit 104. None of these circuits include transformers. The first capacitive isolator circuit 101 couples the incoming digital data signal from the second modem circuit 16 to the receiver 20. The transmitter 19 outputs the outgoing digital data signal to the second modem circuit 16 via the second capacitive isolator circuit 102. Similarly, the controller 18 outputs the pair of control signals, the frame synchronization signal (T/R FS) and the clock signal (MCLK), to the second modem circuit 16 via the third and fourth capacitive isolator circuits 103 and 104 respectively. Each of the capacitive isolator circuits 101, 102, 103 and 104 operates to couple a particular signal between modem circuits 15 and 16 while electrically isolating the first modem circuit 15 from the second modem circuit 16.

The off hook circuit 27 is preferably an electro-optical relay device for connecting the telephone line 11 to the full wave rectifier 28 in response to the control signal supplied by the controller 18. The preferred off hook circuit 27 is a model LH1516 high voltage solid state relay manufactured by AT&T Microelectronics in Allentown, Pa. The model LH1516 relay includes an input control LED and a normally open output relay. In response to the control signal, the input control LED optically couples an internal control signal to the output relay, thereby closing the relay and supplying a signal path between the telephone line 11 and the full wave rectifier 28. Accordingly, the off hook circuit 27 also operates to electrically isolate the first modem circuit from the second modem circuit. It should be noted that the off hook circuit 27, like the electro-optical islolator 35, is powered from the first power source 21, and it therefor does not consume power from the telephone line.

During data reception operation, the hybrid circuit 29, which is coupled between the full wave rectifier 28 and the CODEC 30, connects the incoming analog telephone signal to the Receive port of the CODEC 30. The CODEC 30 converts the incoming analog telephone signal into a digital data signal by performing encoding operations in response to control signals from the controller 18. Upon the conclusion of an encoding operation, a Data In port of the CODEC 30 outputs the incoming digital data signal to the receiver 20 via the first capacitive isolator circuit 101. The receiver 20 performs well-known data processing and error detection/correction operations upon the incoming digital data signal and thereafter outputs received data to the data device via the signal path 12.

For data transmission operation, the data device sends transmit data to the controller 18 and the transmitter 19 via the signal path 13. In response to the transmit data, the controller 18 enables the transmitting operations of the transmitter 19, such as data compression, data encoding, format, protocol, and error control operations. In turn, the transmitter 19 outputs the outgoing digital data signal to a Data Out input port of the CODEC 30 via the second capacitive isolator circuit 102.

The CODEC 30 conditions (decodes) the outgoing digital data signal by providing an analog outgoing telephone signal in response to the outgoing digital data signal and to the control signals received at the Control Port input port of the CODEC 30. The CODEC 30 then outputs an outgoing analog telephone signal via a Transmit port of the CODEC 30 to the hybrid circuit 29 for transmission over the telephone line 11. The hybrid circuit 29 sends the outgoing analog telephone signal, via the full wave rectifier 28 and the off hook circuit 27, by increasing and decreasing (modulating) the line current drawn from telephone line 11. Thus, the hybrid circuit 29, the full wave rectifier 28, and the off hook circuit 27 provide the outgoing analog telephone signal to the telephone line 11 to effect the transmission of the outgoing analog telephone signal.

The second power source 22, connected to the positive port of the full wave rectifier 28 via a signal path 37, includes a filter 40 and a voltage regulator 41. The filter 40, which is referred to as a gyrator, presents a low DC resistance and a high AC impedance to the signals at the junction 36 formed by the connection of the positive port of the rectifier 28, a port of the hybrid circuit 29, and the signal path 37. Thus, the filter 40 prevents the audio frequency signals at the junction 36 from being attenuated by the load caused by the regulator circuit 41. Thus, the filter 40 effectively simulates an inductive component by passing only the DC component at the junction 36 to the voltage regulator 41 via a line 42. The construction and operation of the filter 40 is described in the above-identified patent to Farkas, which has been incorporated herein by reference.

The output of the filter 40 contains only a DC signal component and is supplied to the input of the voltage regulator 41 via the line 42. The voltage regulator 41 operates to supply regulated power to the second modem circuit 16 and to portions of the first, second, third and fourth capacitive isolators. The voltage regulator 41 comprises a zener diode 43 for clamping the output voltage of the filter 40 as the input to a switching voltage regulator 44 for supplying regulated power. The preferred switching voltage regulator is a model MAX 638 manufactured by Maxim, Sunnyvale, Calif. The switching voltage regulator 44 supplies a regulated operating voltage $V_A$ with respect to reference ground 24 to the second modem circuit 16. The regulated operating voltage $V_A$ is preferably a fixed +5 volts.

Figure 2:
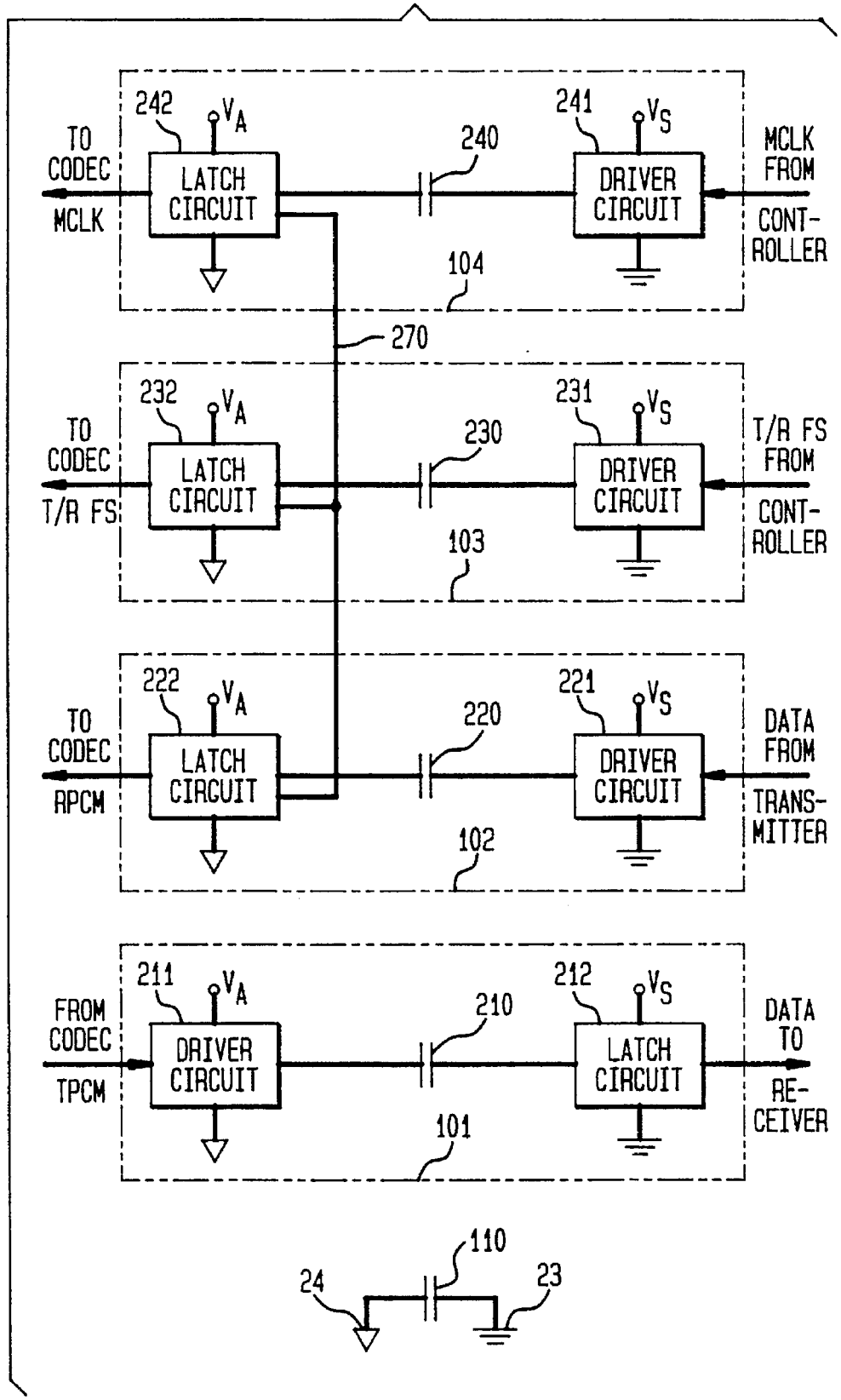
FIG. 2 is a schematic block diagram of the preferred capacitive isolators shown as blocks in FIGS. 1A and 1B.

A schematic block diagram of the first, second, third and fourth capacitive isolation circuits 101–104 is shown in FIG. 2. All of the circuits are identical in performance to each other. The only difference in FIG. 2 is that data from the transmitter 19 and the control signals (MCLK and T/R FS) from the Controller 18 flow through isolation circuits 102–104 respectively from right to left in the figure whereas data from the CODEC 30 to receiver 20 flows from left to right in isolation circuit 101 in the figure. In each case, a driver circuit 211, 221, 231 or 241 provides a low impedance path to one of the coupling capacitors 210, 220, 230 or 240 respectively. Each of the coupling capacitors 210, 220, 230 and 240 is rated at a sufficiently high DC voltage rating to provide the adequate electrical isolation required by the FCC or other regulatory agency. In the embodiment constructed for use in the U.S., each of the capacitors had a rating of 1000 volts. Capacitor 110, which is advantageously connected between ground 23 and ground 24 in order to provide a return path for the driver circuits, is also rated at the same voltage in order to ensure adequate isolation.

Each of the capacitors 210, 220, 230 and 240 is coupled to a latch circuit 212, 222, 232, and 242, respectively. The criteria for selecting the value for each of these capacitors is based primarily on the desire to minimize the effect of interfering common mode signals picked up on the tip and ring of the telephone line and on the desire to couple the much higher frequency data signals. The interfering common mode signals are primarily at 60 Hertz whereas the data signals occur at a rate of about 2 megahertz. As will be apparent after a discussion of the specific circuits used to implement the latch circuit, each latch circuit presents a real impedance to its respective capacitor at the data frequency. Accordingly, each capacitor need only be large enough to combine with this real impedance to provide a differentiating circuit which operates upon each data pulse at the output of its corresponding latch circuit to cause the latch circuit to switch output states. In the embodiment which was constructed, each of the capacitors 110, 210, 220, 230 and 240 had a value of about 220 picofarads, and therefor each presented a rather substantial impedance at 60 Hertz.

A negative-going transition in the data pulse at the output of the driver circuit causes a negative spike of voltage to be developed at the input of the latch circuit thereby causing the latch circuit to switch its output to a low voltage state equivalent to a logical zero. Similarly, a positive-going transition in the data pulse at the output of the driver circuit causes a positive spike in voltage to be developed at the input of the latch circuit thereby causing the latch circuit to switch its output to a high voltage state equivalent to a logical one. In response to these voltage spikes, the latch circuit develops a voltage wavefrom at its output substantially identical to the data presented at the input to its corresponding driver circuit.

Figure 3:
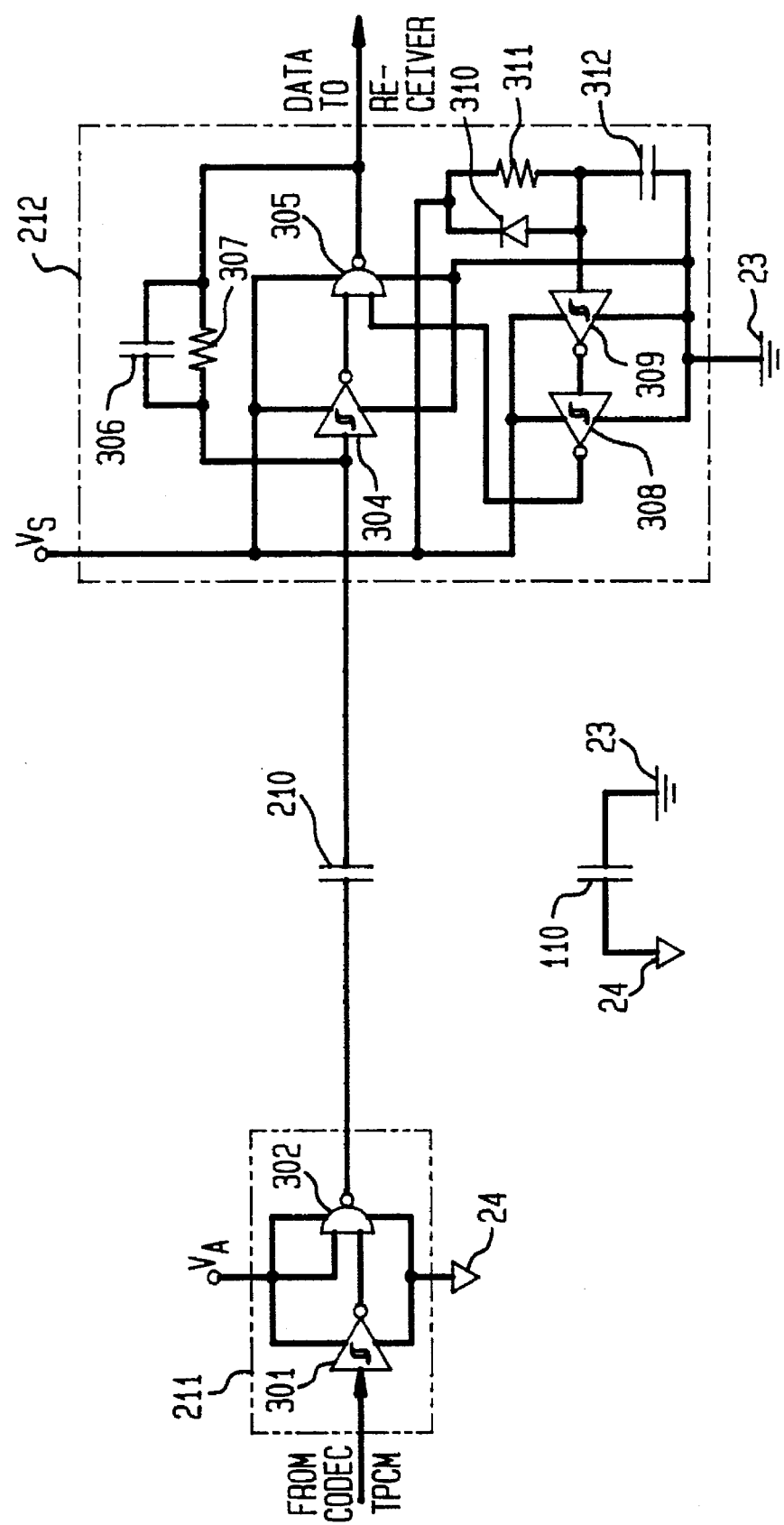
FIG. 3 is a detailed schematic diagram of one of the capacitive isolators shown in block form in FIG. 2.

The operation of the driver circuits and the latch circuits will be better understood after a discussion of the detailed schematic diagram of the capacitive isolation circuit 101 shown in FIG. 3. In FIG. 3, TPCM data from the CODEC is coupled to the input of an inverter circuit 301, the output of which is connected to one input of a nand gate 302. Both circuits are connected to operate between positive potential source $V_A$ and ground 24. Since the second input of nand gate 302 is also connected to $V_A$, the nand circuit is simply operating as an inverter, and both circuits combine to provide a low impedance source of the data waveform present at the input of driver circuit 211. A nand gate is used simply because it is available due to the required use of a nand gate in each of the latch circuits 222, 232 and 242 in FIG. 2, all of which operate from the positive potential source of $V_A$ with respect to ground 24.

The output of the nand gate 302 is connected to one terminal of coupling capacitor 210, the second terminal of which is connected to the input of latch circuit 212 which, as shown in FIG. 3, corresponds to the input of an inverter circuit 304. The output of inverter circuit 304 is connected to one input of a nand gate 305, the output of which serves as the output of latch circuit 212. A positive feedback resistor 307 is connected between the input of inverter circuit 304 and the output of nand gate 305. Since the output of nand gate 305 is essentially at zero impedance for high frequencies, feedback resistor 307 combines with coupling capacitor 210 to provide a differentiator circuit for the data pulses provided at the output of driver circuit 211. In the embodiment which was constructed where coupling capacitor 210 had a value of about 220 picofarads, resistor 307 had a value of about 5 K Ohms. Both the inverter circuit 304 and the nand gate 305 operate between positive potential source $V_S$ and ground 23. Capacitor 110 connected between ground 24 and ground 23 is also shown in FIG. 3 since the return current for voltage pulses at the output of driver circuit 211 must also flow through this capacitor. Accordingly, the value of capacitor 110 also effects the differentiating action provided by coupling capacitor 210.

Normally, a logic one is presented to the second input of nand gate 305, and nand gate 305 operates as an inverter. Accordingly, a negative voltage spike at the second terminal of coupling capacitor 210 causes the output of nand gate 305 to go negative and thereby clamp the input of inverter gate 304 to a low potential value by the positive feedback provided by the feedback resistor 307. Similarly, a positive-going voltage spike at the second terminal of coupling capacitor 210 causes the output of nand gate 305 to go positive and thereby clamp the input of inverter gate 304 to a high potential value by the positive feedback provided by resistor 307.

A low valued capacitor 306 is connected in parallel with resistor 307 in order to eliminate the effects of spurious voltage spikes that are higher in frequency than the voltage spikes provided by the data of interest. In the embodiment which was constructed, capacitor 306 was caused to have a value of about 10 picofarads.

The remainder of the elements within latch circuit 212 serve to perform a reset function. When the circuit is turned off, $V_S$ is equal to zero and the voltage across capacitor 312 is also equal to zero. When the circuit is initially turned on, the voltage across capacitor 312 cannot change instantaneously since is must charge up through resistor 311. Hence during this initial charge up period, this zero voltage across capacitor 312 is coupled through inverter circuits 309 and 308 to appear as a logic zero at the second input of nand gate 305. This logic zero ensures that the output of nand gate 305 will initially be a logic one. After the capacitor 312 charges up to a value near $V_S$, the positive voltage on capacitor 312 is coupled through inverter circuits 309 and 308 to appear as a logic one at the second input of nand gate 305, thereafter permitting nand gate 305 to function simply as an inverter. A diode 310 is also connected in parallel with resistor 311 with its anode connected to capacitor 312 and its cathode connected to potential source $V_S$ in order to rapidly discharge capacitor 312 when the circuit is turned off. As a result, the circuit can be turned off and immediately turned back on, and the reset function will be enabled since nand gate 305 is guaranteed to have an initial zero at its second input.

The remainder of the capacitive isolation circuits are identical in construction and performance to the one described hereinabove in connection with FIG. 3. The other three nand gates on the same chip as nand gate 305 in the latch circuit 212 can serve as inverter circuits in driver circuits 221, 231 and 241 similar to nand gate 302 in latch circuit 211. In order to conserve power drawn from the $V_A$ source, only one of the latch circuits 222, 232 or 242 need include reset elements equivalent to elements 308–312 in latch circuit 212. The output of the element equivalent to inverter circuit 308 can be connected to the second input of all of the nand gates in latch circuits 222, 232 and 242 by way of the line 270 shown in FIG. 2. As a result, only four standard SSI integrated circuit chips are necessary to perform all of the inverter and gate functions within all of the latch circuits and all of the driver circuits of the four capacitive isolation circuits 101–104. In the embodiment constructed, two industry standard 74HC00 integrated circuit chips and two industry standard 74HC14 integrated circuit chips were used to perform all of the inverter and gate functions. Consequently, a current of much less than 1 milliamp is required from the second power source for the capacitive isolation circuits as compared with about 30 milliamps for the four electro-optical isolators.

Numerous departures can be made by those skilled in the art without departing from the spirit and scope of the present invention. For example, although controller 18, transmitter 19, and receiver 20 have been shown as distinct components for clarity of explanation, it will be appreciated that these functions may be performed by a single microprocessor, if desired, with the functions representing different routines within the operating program for the microprocessor. In addition, some of the driver circuits may not be necessary if the circuitry delivering the data pulses to the coupling capacitors 210, 220, 230 and 240 have sufficiently low impedance.

What is claimed is:

1. A modem comprising a first modem circuit including a transmitter for providing an outgoing digital data signal, a receiver for receiving an incoming digital data signal, and a control means for providing a pair of control signals; a coder/decoder (CODEC) means coupled to a telephone line for providing said incoming digital data signal by encoding an incoming analog telephone signal received via said telephone line and for providing an outgoing analog telephone signal for transmission over said telephone line by decoding said outgoing digital data signal; a first power source, which does not draw power from said telephone line, for supplying a potential, with respect to a first reference ground, to said first modem circuit; a second power source functionally connected to said telephone line for supplying a potential, with respect to a second reference ground, to said CODEC means by drawing power only from said telephone line; and isolation means connected between said CODEC means and said first modem circuit for electrically isolating said CODEC means from said first modem circuit; characterized in that said isolation means includes a first capacitive isolator means having a coupling capacitor with two terminals for coupling said incoming digital data signal from said CODEC means to said first modem circuit, a second capacitive isolator means having a coupling capacitor with two terminals for coupling said outgoing digital data signal from said first modem circuit to said CODEC means, third and fourth capacitive isolator means each having coupling capacitors with two terminals for coupling said pair of control signals from said control means to said CODEC means, a capacitor connected between said first reference ground and said second reference ground, and a latch circuit having an input connected to one of the terminals of the coupling capacitor of at least of the capacitor isolator means.

2. The modem as defined in claim 1, wherein the input of a latch circuit is connected to the coupling capacitor of the first capacitive isolator means.

3. The modem as defined in claim 1, wherein the input of a latch circuit is connected to the coupling capacitor of the second capacitive isolator means.

4. The modem as defined in claim 1, wherein the input of a latch circuit is connected to the coupling capacitor of the both the third and fourth capacitive isolator means.

5. A modem as defined in claims 2, 3, or 4 wherein said latch circuit comprises an inverter circuit having an input and an output, a nand gate having two inputs and an output, means for connecting the output of said inverter circuit to one of said two inputs of said nand gate, a feedback resistor connected between the output of said nand gate and the input of said inverter circuit, and a reset means connected to the other of said two inputs of said nand gate for momentarily connecting a potential equivalent to a logic zero to said other input of said nand gate when said at least one latch circuit is first energized with power.

6. A data access arrangement circuit for electrically isolating a telephone line from a first modem circuit including a transmitter for providing an outgoing digital data signal, a receiver for receiving an incoming digital data signal, and a control means for providing a pair of control signals; said first modem circuit powered only by a first power source that provides a potential with respect to a first reference ground and which does not draw power from said telephone line; said data access arrangement circuit comprising a CODEC means coupled to said telephone line for providing said incoming digital data signal by encoding an incoming analog telephone signal received from said telephone line and for providing an outgoing analog telephone signal for transmission over said telephone line by decoding said outgoing digital data signal; a second power source for supplying a potential with respect to a second reference ground to said CODEC means by drawing power only from said telephone line; and isolation means connected between said CODEC means and said first modem circuit for electrically isolating said CODEC means from said first modem circuit; characterized in that said isolation means includes a first capacitive isolator means having a coupling capacitor with two terminals for coupling said incoming digital data signal from said CODEC means to said first modem circuit, a second capacitive isolator means having a coupling capacitor with two terminals for coupling said outgoing digital data signal from said first modem circuit to said CODEC means, third and fourth capacitive isolator means each having coupling capacitors with two terminals for coupling said pair of control signals from said control means to said CODEC means, a capacitor connected between said first reference ground and said second reference ground, and a latch circuit having an input connected to one of the terminals of the coupling capacitor of at least of the capacitor isolator means.

7. The data access arrangement circuit as defined in claim 6, wherein the input of a latch circuit is connected to the coupling capacitor of the first capacitive isolator means.

8. The data access arrangement circuit as defined in claim 6, wherein the input of a latch circuit is connected to the coupling capacitor of the second capacitive isolator means.

9. The data access arrangement circuit as defined in claim 6, wherein the input of a latch circuit is connected to the coupling capacitor of the both the third and fourth capacitive isolator means.

10. A data access arrangement circuit as defined in claims 7, 8, or 9 wherein said latch circuit comprises an inverter circuit having an input and an output, a nand gate having two inputs and an output, means for connecting the output of said inverter circuit to one of said two inputs of said nand gate, a feedback resistor connected between the output of said nand gate and the input of said inverter circuit, and a reset means connected to the other of said two inputs of said nand gate for momentarily connecting a potential equivalent to a logic zero to said other input of said nand gate when said at least one latch circuit is first energized with power.

11. A capacitive isolator circuit for a modem comprising:
   a coupling capacitor having a first terminal and a second terminal;
   a driver circuit having an output electrically connected to the first terminal;
   a latch circuit having an input electrically connected to the second terminal, the latch circuit further including an inverter circuit having an input and an output, a nand gate having a first and second input and an output, means for connecting the output of the inverter circuit to the first input of the nand gate, a feedback resistor connected between the output of the nand gate and the input of the inverter circuit, and a reset means connected to the second input of said nand gate for momentarily connecting a potential equivalent to a logic zero to the second input of the nand gate when the latch circuit is first energized with power.

* * * * *

UNITED STATES PATENT AND TRADEMARK OFFICE
CERTIFICATE OF CORRECTION

PATENT NO. : 5,655,010
DATED : August 5, 1997
INVENTOR(S) : Thomas J. Bingel

It is certified that error appears in the above-indentified patent and that said Letters Patent is hereby corrected as shown below:

Column 10, line 45, replace "m" with - - in - -.

Signed and Sealed this

Seventh Day of October, 1997

Attest:

BRUCE LEHMAN

*Attesting Officer*          *Commissioner of Patents and Trademarks*